(12) United States Patent
Martensen et al.

(10) Patent No.: US 10,488,179 B2
(45) Date of Patent: Nov. 26, 2019

(54) METHOD FOR SIGNAL PROCESSING IN OPTICAL COHERENCE TOMOGRAPHY BY MEANS OF A TUNABLE LIGHT SOURCE

(71) Applicant: HEIDELBERG ENGINEERING GMBH, Heidelberg (DE)

(72) Inventors: Björn Martensen, Lübeck (DE); Andreas Fritz, Utecht (DE)

(73) Assignee: Heidelberg Engineering GmbH (DE)

( * ) Notice: Subject to any disclaimer, the term of this patent is extended or adjusted under 35 U.S.C. 154(b) by 0 days.

(21) Appl. No.: 16/080,083

(22) PCT Filed: Jan. 19, 2017

(86) PCT No.: PCT/DE2017/100026
§ 371 (c)(1),
(2) Date: Aug. 27, 2018

(87) PCT Pub. No.: WO2017/148463
PCT Pub. Date: Sep. 8, 2017

(65) Prior Publication Data
US 2019/0063897 A1 Feb. 28, 2019

(30) Foreign Application Priority Data
Mar. 1, 2016 (DE) .................. 10 2016 103 605

(51) Int. Cl.
*G01B 9/02* (2006.01)

(52) U.S. Cl.
CPC ..... *G01B 9/02091* (2013.01); *G01B 9/02004* (2013.01); *G01B 9/02069* (2013.01); *G01B 2290/60* (2013.01)

(58) Field of Classification Search
CPC ............ G01B 9/02091; G01B 9/02004; G01B 9/02069
See application file for complete search history.

(56) References Cited

U.S. PATENT DOCUMENTS 5,956,355 A * 9/1999 Swanson ............ A61B 1/00183
356/479
7,289,225 B2 * 10/2007 De Groot ........... G01B 11/0675
356/497

(Continued)

OTHER PUBLICATIONS

International Search Report and Written Opinion issued in PCT/DE2017/100026, dated Mar. 29, 2017; ISA/EP.

(Continued)

*Primary Examiner* — Jonathan M Hansen
(74) *Attorney, Agent, or Firm* — Harness, Dickey & Pierce, PLC

(57) ABSTRACT

The invention relates to a method for signal processing in optical coherence tomography by means of a tunable light source (swept source), comprising the following steps: tuning the light source and sensing a signal intensity of the light source in linear dependence on the respective wave number (k) of the tunable light source and producing a signal intensity distribution in dependence on k; applying a window function to the sensed signal intensity distribution and producing a weighted signal intensity distribution; and applying a fast Fourier transform (FFT) to the weighted signal intensity distribution; and characterized in that, in the tuning of the light source, the tuned frequency spectrum is limited to a passband of the window function.

9 Claims, 3 Drawing Sheets

(56) References Cited

U.S. PATENT DOCUMENTS

Figure 1:
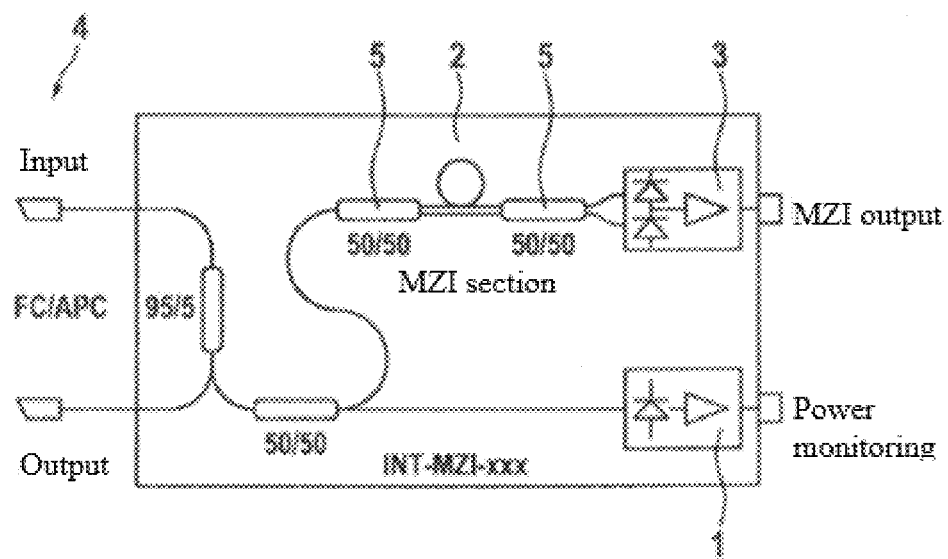

2014/0028997 A1 1/2014 Cable et al.
2014/0257095 A1* 9/2014 Kemp .................. A61B 8/12
 600/427
2015/0351630 A1 12/2015 Engelhardt et al.

OTHER PUBLICATIONS

Thomas Klein et al., "Megahertz OCT for ultrawide-field retinal imaging with a 1050nm Fourier domain mode-locked laser", Science Am. J. Ophtalmol. Opt. Lett. Prog. Retin. Eye Res. Clin. Experiment. Ophtalmol. Optics Express, Feb. 14, 2011, pp. 1178-1181.
Biedermann, B.R. et al., "Real time en face Fourier-domain optical coherence tomography with direct hardware frequency demodulation", Optics Letters, Optical Society of America, vol. 33, No. 21, Nov. 1, 2008, pp. 2556-2558.
Woojhon Choi, et al., "Phase-sensitive swept-source optical coherence tomography imaging of the human retina with a vertical cavity surface-emitting laser light source", Optics Letters, Optical Society of America, vol. 38, No. 3, Feb. 1, 2013, pp. 338-340.

* cited by examiner

METHOD FOR SIGNAL PROCESSING IN OPTICAL COHERENCE TOMOGRAPHY BY MEANS OF A TUNABLE LIGHT SOURCE

CROSS-REFERENCE TO RELATED APPLICATIONS

This application is a 371 U.S. National Stage of International Application No. PCT/DE2017/100026, filed on Jan. 19, 2017, which claims priority to German Application 10 2016 103 605.6, filed Mar. 1, 2016. The entire disclosures of the above applications are incorporated herein by reference.

FIELD

The invention starts with a method for signal processing in optical coherence tomography by means of a tunable light source (swept source), wherein the method comprises the steps:

tuning the light source and sensing a signal intensity of the light source in linear dependence on the respective wave number (k) of the tunable light source and producing a signal intensity distribution in dependence on k;

applying a window function to the sensed signal intensity distribution and producing a weighted signal intensity distribution; and applying a Fast Fourier Transform (FFT) to the weighted signal intensity distribution.

BACKGROUND

This section provides background information related to the present disclosure which is not necessarily prior art.

The window function leads to portions of the signal not being used, since they are "windowed out," i.e., filtered out. To increase the usable spectrum range and to amplify the signal intensity, it is desirable to minimize the lost proportion by applying the window function.

SUMMARY

This section provides a general summary of the disclosure, and is not a comprehensive disclosure of its full scope or all of its features.

To achieve this, it is proposed to limit the tuned frequency spectrum to a passband of the window function in the tuning of the light source.

The window function applied can be a von Hann window. In principle, a light source of which the spectrum shape corresponds to the curve of the window function would be optimal. In order to obtain at the same time, the best possible side wall suppression, a Gaussian light distribution in the k-space can be used as a suitable compromise. Thus, the tunable light source can have a Gaussian light intensity distribution in the k-space. In particular, the spectrum shape of the light source in the k-space can correspond to the shape of the curve of the window function or at least approximate said curve.

In the same way, for a determination of the spectrum shape of the light source in the k-space, the temporal curve of the signal intensity and the sweep speed curve can be measured. The temporal curve of the signal intensity can be recorded, for example, with a photodiode.

The sweep speed curve can be determined, for example, with the aid of a Mach-Zehnder interferometer (MZI), in that two fiber Bragg gratings of known and differing reflection wavelength are arranged in the beam propagation path between interferometer and detector, and a modulation frequency of the tunable light source, which is proportional to the sweep speed, is sensed and plotted versus time, so that the modulation frequency curve has two dips in each case at a certain wavelength or wave number, and wherein, the sweep speed curve can be determined from the obtained MZI signal curve by Short Time Fourier Transform (STFT).

The envelope of the modulation frequency curve can be determined, and its deviation from a reference shape from the window function, in particular from the Gaussian shape, can be sensed. Moreover, for an adaptation of the envelope of the modulation frequency curve to the reference shape of the window function, the current of a Semiconductor Optical Amplifier (SOA) of the light source can be modulated or the sweep speed curve can be varied.

The data sensed for the determination of the envelope of the modulation frequency curve can be used via a feedback loop for the fine tuning of the swept source, in particular of a VCSEL light source.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
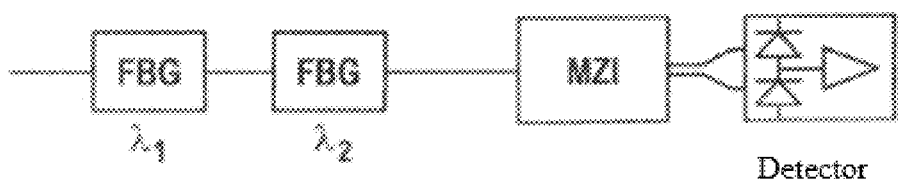
Figure 3:
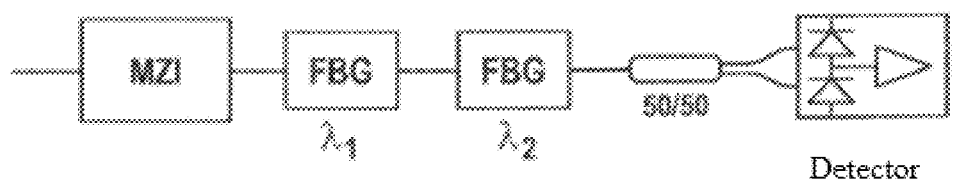

Additional details of the invention are explained in reference to the following figures. In the drawings:

FIG. 1 diagrammatically shows a set-up for the power measurement and determination of the sweep speed curve of a tunable light source;

FIG. 2 shows a first arrangement for producing wavelength marks for the sensing of the spectrum shape of the tunable light source; and FIG. 3 shows another arrangement for the production of wavelength marks for the determination of the spectrum shape of a tunable light source.

DETAILED DESCRIPTION

Example embodiments will now be described more fully with reference to the accompanying drawings.

The spectrum shape of the tunable light source in the k-space is not directly measurable. However, the measurement arrangements reproduced diagrammatically in FIGS. 1-3 make it possible to determine the spectrum shape in the k-space directly by evaluation of parameters that can be sensed.

In a first step, by exposure of the signal to a photodiode 1 or to other light-sensitive measurement cells, the envelope of the light intensity of the tunable light source versus time can be sensed.

The measurement of the sweep speed curve occurs with the aid of a Mach-Zehnder interferometer (MZI) 3, in that the modulation frequency, which is proportional to the sweep speed, is analyzed and plotted versus time. In addition, two sites in the sweep are marked, in that two fiber Bragg gratings 5 of known and differing reflection wavelength are arranged between interferometer 4 and detector 3. By means of said gratings, signal dips in the MZI raw signal are produced, which correspond to a corresponding wavelength or wave number.

From the MZI signal, with the aid of a STFT, a speed curve can be produced. From the data obtained as described above, a conclusion can be drawn as to the power distribution in the k-space. This makes it possible to determine the deviation of the spectrum shape of the tunable light source from the optimal Gaussian shape.

For the optimization of the spectrum shape of the tunable light source, for example, the current of a semiconductor optical amplifier (SOA) of the light source can then be modulated or the sweep speed curve can be varied. The two ways are in principle equally suitable, although a speed of the sweep that is as constant as possible is considered to be advantageous in order to be able to save detector bandwidth, which in turn improves the measurement sensitivity.

The dated obtained by means of the above-described method can be used via feedback loop for automatic fine tuning of the VCSEL light source or any other suitable swept source.

The features of the invention disclosed in the above description, in the drawings and in the claims can be essential both individually and also in any combination for the implementation of the invention.

The invention claimed is:

1. A method for signal processing in optical coherence tomagraphy by means of a tunable light source (swept source), which comprises the steps:
    tuning the light source and sensing a signal intensity of the light source in linear dependence on the respective wave number (k) of the tunable light source and producing a signal intensity distribution in dependence on k;
    applying a window function to the sensed signal intensity distribution and producing a weighted signal intensity distribution;
    applying a fast Fourier transform (FFT) to the weighted signal intensity distribution; characterized in that, in the tuning of the light source, the tuned frequency spectrum is limited to a passband of the window function; and
    wherein the sweep speed curve is determined with the aid of a Mach-Zehnder interferometer (MZI), in that two fiber Bragg gratings of known reflection wavelength are arranged in the beam propagation path between interferometer and detector, and a modulation frequency of the tunable light source, which is proportional to the sweep speed, is sensed and plotted versus time, so that the modulation frequency curve comprises two dips at a certain wavelength or wave number, and wherein the sweep speed curve is determined from the obtained MZI signal curve by short time Fourier transform (STFT).

2. The method according to claim 1, wherein, in the application of the window function, a von Hann window is applied.

3. The method according to claim 1, wherein the tunable light source has a Gaussian light intensity distribution in the k-space.

4. The method according to claim 1, wherein the spectrum shape of the light source in the k-space corresponds to the shape of the curve of the window function or at least approximates it.

5. The method according to claim 1, wherein, for a determination of the spectrum shape of the light source in the k-space, the temporal curve of the signal intensity and the sweep speed curve are measured.

6. The method according to claim 5, wherein the temporal curve of the signal intensity is recorded with a photodiode.

7. The method according to claim 1, wherein the envelope of the modulation frequency curve is determined and the deviation thereof from a reference shape of the window function, in particular from the Gaussian shape, is sensed.

8. The method according to claim 7, wherein, for an adaptation of the envelope of the modulation frequency curve to the reference shape of the window function, the current of a semiconductor optical amplifier (SOA) of the light source is modulated or the sweep speed curve is varied.

9. The method according to claim 5, wherein the data sensed for the determination of the envelope of the modulation frequency curve is used via a feedback loop for the fine tuning of a VCSEL light source.

* * * * *